United States Patent
Orlik et al.

(10) Patent No.: US 7,035,677 B2
(45) Date of Patent: Apr. 25, 2006

(54) SYSTEM AND METHOD FOR REDUCING POWER CONSUMPTION IN A WIRELESS COMMUNICATIONS NETWORK

(75) Inventors: Philip Orlik, Cambridge, MA (US);
Zafer Sahinoglu, Somerville, MA (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 433 days.

(21) Appl. No.: 10/347,897

(22) Filed: Jan. 21, 2003

(65) Prior Publication Data
US 2004/0142716 A1    Jul. 22, 2004

(51) Int. Cl.
*H04B 1/38* (2006.01)

(52) U.S. Cl. .......................... 455/574; 455/522; 455/69

(58) Field of Classification Search ................ 455/522, 455/11.1, 445, 574, 343, 69, 426.1, 463; 370/334, 400, 318, 312
See application file for complete search history.

(56) References Cited

U.S. PATENT DOCUMENTS

| | | | | |
|---|---|---|---|---|
| 5,369,784 | A * | 11/1994 | Nelson | 455/503 |
| 6,292,508 | B1 * | 9/2001 | Hong et al. | 375/134 |
| 6,735,448 | B1 * | 5/2004 | Krishnamurthy et al. | 455/522 |
| 2003/0013474 | A1 * | 1/2003 | Pham et al. | 455/522 |
| 2003/0040316 | A1 * | 2/2003 | Stanforth et al. | 455/445 |

* cited by examiner

*Primary Examiner*—Tilahun Gesesse
(74) *Attorney, Agent, or Firm*—Dirk Brinkman; Andrew J. Curtin

(57) ABSTRACT

A system and method reduce power consumption in a multi-hop wireless communications network. A signal is received from a source node in an intermediate node. The signal includes a request to relay a message to a destination node. The request includes information on power requirements to relay the message either in a relay mode or a regeneration mode. If the available power at the intermediate node exceeds the power requirements, then the request is accepted. Either the relay mode or the regeneration mode is selected, based on criteria for retransmitting the message, and the message is then relayed to the destination node using the selected mode.

9 Claims, 4 Drawing Sheets

SYSTEM AND METHOD FOR REDUCING POWER CONSUMPTION IN A WIRELESS COMMUNICATIONS NETWORK

FIELD OF THE INVENTION

This invention relates generally to the field of wireless communications, and more particularly to power efficient multi-hop data transmission in wireless communications networks.

BACKGROUND OF THE INVENTION

In an ad hoc wireless network, transceivers or "nodes" are arranged to communicate with each other without any network infrastructure or centralized administration. The arrangement can be static or dynamic, or combinations thereof. The nodes can be cellular telephones, portable computing devices, or special purpose devices such as sensors. The nodes in the network establish routing among themselves to form their own network. Due to a limited transmission range of the transceivers, messages from a source node may have to pass through one or more intermediate routing nodes before reaching a destination node.

In many ad hoc wireless networks, most, if not all of the nodes are battery powered. Therefore, minimizing power consumption is a primary concern. Some techniques for reducing power decrease transcoder complexities, use low power circuits and low signaling-cost routing protocols. Other techniques attempt to exploit the network topology to reduce power.

Heinzelman et al., in "*Energy-efficient Communication Protocol for Wireless Micro-sensor Networks,*" Proc. of the IEEE Hawaii Int. Conf. on System Sciences, pp. 3005–3014, January, 2000, describe communication protocols for power reduction in a wireless network. They describe a clustering based protocol that utilizes randomized rotation of local cluster heads to evenly distribute the power load among the nodes in the network. They also indicate that when the distance between two nodes is short, direct transmission is more efficient than multiple hop transmission.

Chang et al, in "*Energy Conserving Routing in Wireless Ad-hoc Networks,*" Proc. of IEEE INFOCOM 2000, March, 2000, describe methods for selecting routes and corresponding power levels in a static wireless network so that power consumption is reduced.

Catovic et al, in "*A new approach to minimum energy routing for next generation multi-hop wireless networks,*" Journal of Communications and Networks, Special Issue on "*Evolving from 3G deployment to 4G definition,*" December 2002, describe a technique for transmitting data over two different channels at different power levels. A rake receiver is used to reconstruct the original data by combining the two received signals.

Chen et al., "*Energy Efficient System Design with Optimum Transmission Range for Wireless Ad-hoc Networks,*" Proc of IEEE Int. Conf. on Communications, ICC'02, pp. 945–952, May, 2002, determine optimum transmission range and hop distances in wireless ad-hoc networks.

The prior art has not addressed the problem of bit error propagation through the multi-hop paths. To eliminate error propagation, the transmit signal power levels must be increased on multi-hop paths. As a result, overall power consumption in the network increases. On the other hand, at each intermediate node, a received signal can be decoded and re-encoded, and then forwarded to the destination or to the next intermediate node. This can prevent error propagation, at the cost of increasing power consumption due to complexities of the transcoding process.

Most important, deciding whether to simply amplify and transmit the data or to regenerate the data depends on the position of the intermediate node relative to the source and destination nodes, and the level of power loss. Therefore, there is a need for a system and method that can reduce power consumption in a wireless ad hoc network.

SUMMARY OF THE INVENTION

The system and method according to the invention reduces power consumption in a multi-hop wireless communications network. A signal from a source node is received at an intermediate node. The signal including a relay request, a message, a relay power requirement and a regeneration power requirement. The request is accepted if available power at the intermediate node exceeds an amount of power required to relay the message to a destination node. A relay mode or a regeneration mode is selected based on local criteria at the intermediate node and the message is relayed to the destination node using the selected mode.

BRIEF DESCRIPTIONS OF THE DRAWINGS

DETAILED DESCRIPTION OF THE PREFERRED EMBODIMENT

System Structure

Figure 1:
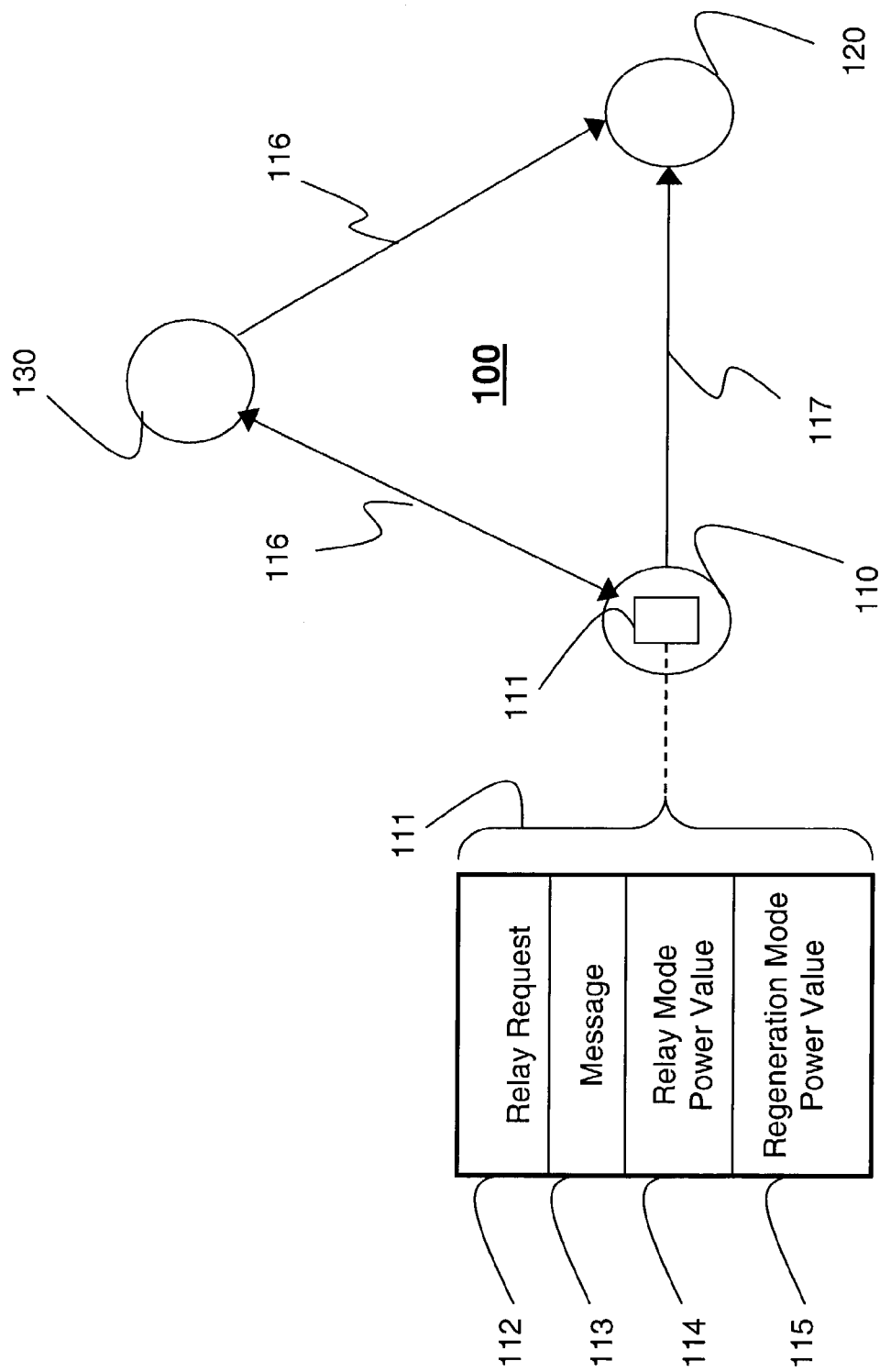
FIG. 1 is a block diagram of a wireless communications network according to the invention.

FIG. 1 shows a wireless communications network 100 according to the invention. The network 100 includes a source node 110, and an intermediate node 130 and a destination node 120. The output of the source node is a signal 111. The signal includes a relay-request 112, a message 113, a relay mode power requirement 114, and a regeneration mode power requirement 115.

A power savings is expressed as a difference between the amount of power required to transmit the message over an indirect path 116 and a direct path 117.

System Operation

Figure 2:
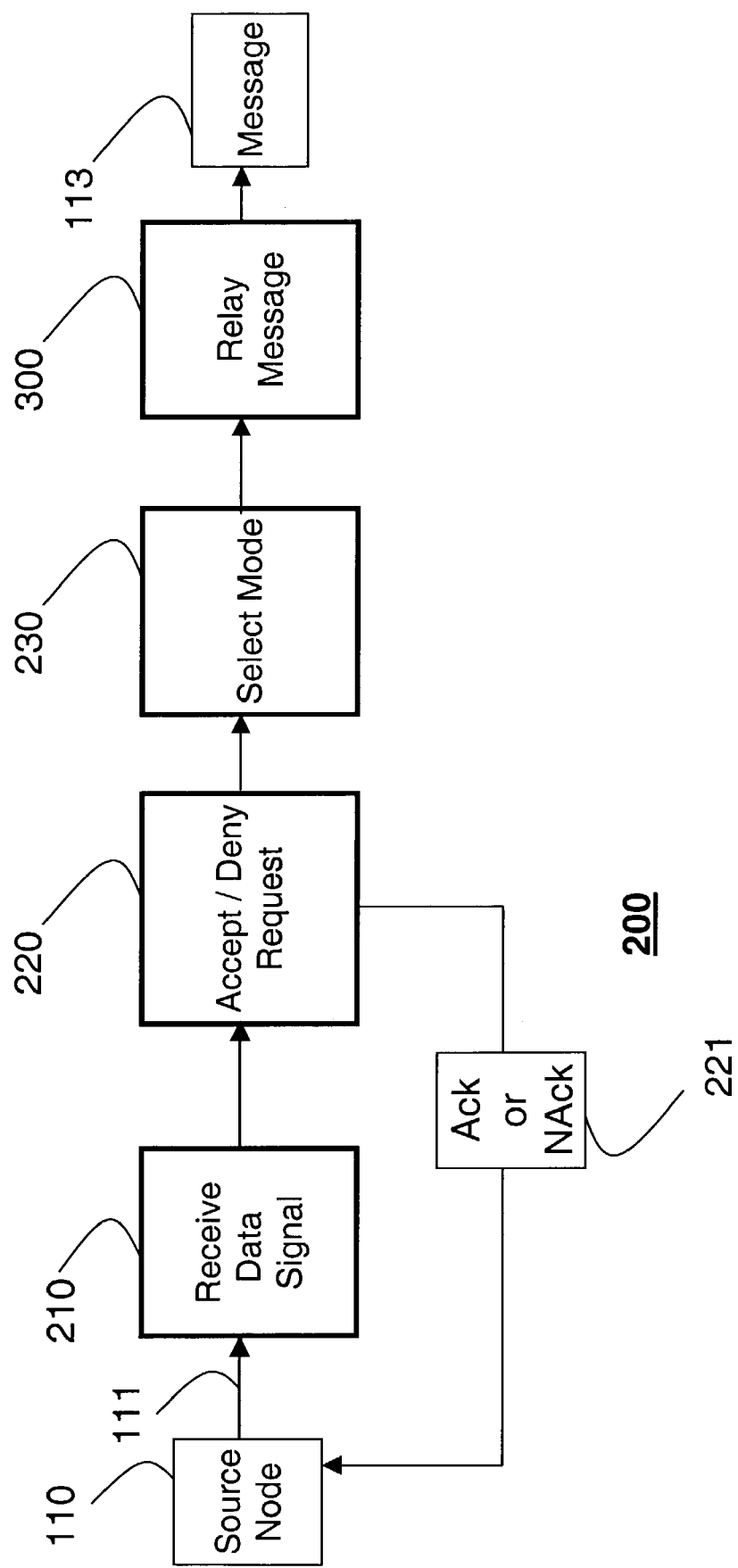
FIG. 2 is a flow diagram of a method for reducing power consumption in a multi-hop wireless communications network according to the invention.

FIG. 2 shows a method 200 for reducing power consumption in a multi-hop wireless communications network 100 according to the invention. The signal 111 is received 210 by the intermediate node 130 from the source node 110.

During step 220, the intermediate node 130 decides whether to accept or deny the request 112 from the source node 110 to relay the message 113 to the destination node 120. Depending on the decision of step 220, the intermediate node sends an indication 221 of acceptance (Ack) or rejection (Nack) of the request. If the request is denied or not accepted within a predetermined amount of time, then the source node 110 can seek another node to act as the intermediate node, or the source node can attempt to send the message 113 directly to the destination node 120.

If the indication 221 is an Ack, the intermediate node selects 230 a mode for relaying the message 113 to the destination node 120. The selected mode can be either a regeneration mode or a relay mode, both of which are discussed in detail below.

Figure 3A:
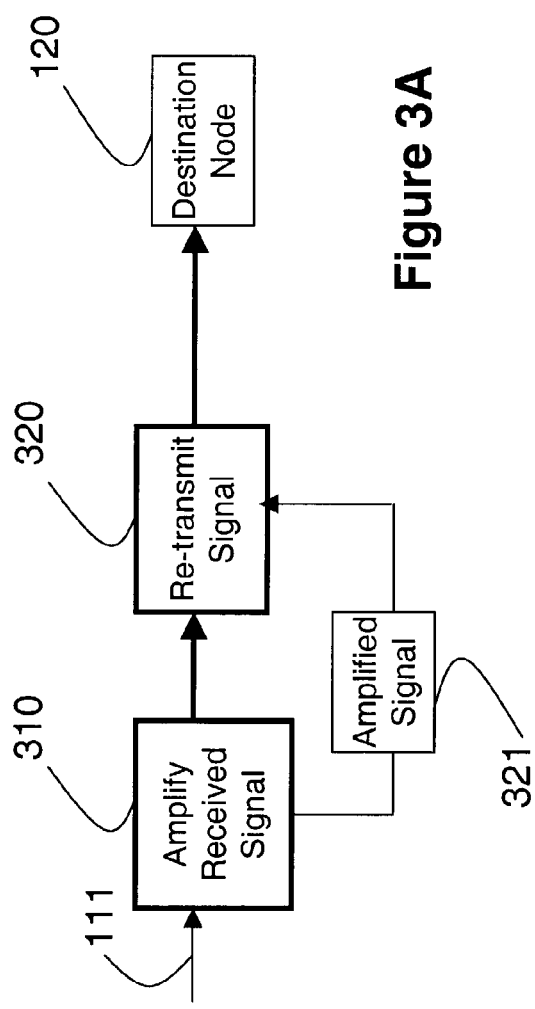
FIG. 3A is a flow diagram of relay mode operation according to the invention.

FIG. 3A shows the steps for the relay mode. Here, the intermediate node 130 amplifies 310 the signal 111 from the source node 110, and retransmits 320 the amplified signal 321 to the destination node 120.

Figure 3B:
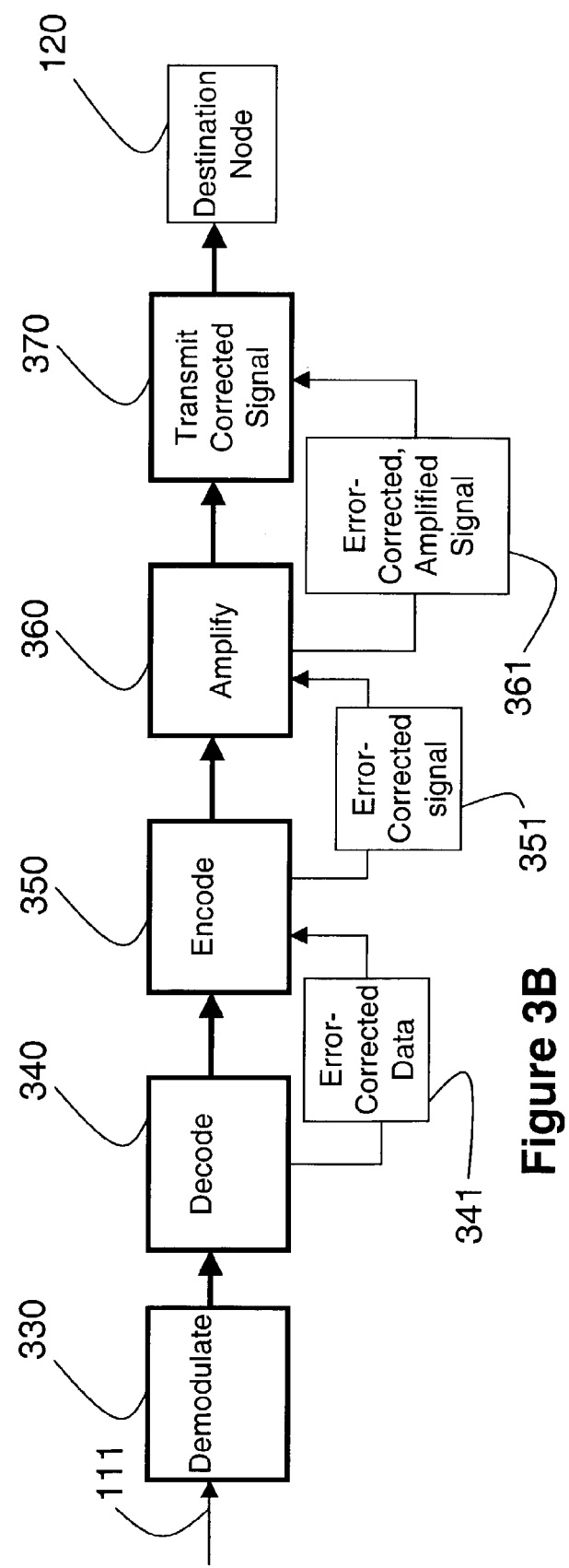
FIG. 3B is a flow diagram of regeneration mode operation according to the invention.

FIG. 3B shows the steps for regeneration mode. In this mode, the signal received at the intermediate node 130 is first demodulated 330 then decoded 340. The decoding 340 process corrects any bit errors that occurred. The decoded data 341 are then encoded 350, amplified 360 and transmitted 370 to the destination node 120.

Regeneration Mode

The source node A 110 determines the amount of power required to transmit the signal 111 directly to destination node B 120 by Equation (1) as:

$$\alpha_{t_e}^{AB} = \alpha_{re} d_{ab}^{\gamma} 10^{x_{ab}/10}, \text{ watts}, \quad (1)$$

where the required power $\alpha_{re}$ meets a bit error rate requirement $Pr_e$, a value $\gamma$ is a path-loss exponent, and a value $x_{ab}$, is a shadowing loss, in decibels, on the path from the source node A 110 to the destination node B 120. The value $\alpha_{re}$ depends on what type of radio modulation is being used, e.g., PAM, QPSK, QAM.

The source node A 110 determines the power savings that could be obtained if intermediate node C 130 acts as a regenerator relay. The power savings is the difference between power used on the relay path A→C→B 116 and the power used on the direct path A→B 117. To find this difference, the source node A 110 determines the power to transmit to intermediate node C 120 and the power used at the intermediate node to transmit to the destination node B 120. These two powers, denoted $(\alpha_{t_e}^A, \alpha_{t_e}^C)$, depend on distances $(d^{ac}, d^{cb})$ and the required bit error rate (BER) $Pr_e$. The power reduction due to regeneration is then determined by Equation (2) as:

$$\Delta\alpha_{regen} = \alpha_{t_e}^A + \alpha_{t_e}^C - \alpha_{t_e}^{AB} + P_c. \quad (2)$$

Equation 2 gives the optimum power saving, neglecting shadowing losses, in the network 100 where the intermediate node acts as a regenerator and relays the signal the source node 110 to the destination node 120.

FIG. 3A shows the regenerator relay method with the computed transmit powers at the source node A 110 and intermediate node C 130 $(\alpha_{t_e}^A, \alpha_{t_e}^C)$. Depending on the distances between the nodes. The power reduction $\Delta\alpha_{regen}$ can be positive or negative.

If the power reduction $\Delta\alpha_{regen}$ is positive, then the source node does not send a relay request to the intermediate node. If the power reduction $\Delta\alpha_{regen}$ is negative, then the source node sends the relay request to the intermediate node.

Relay Mode

In relay mode, the intermediate node 130 forwards the message 113 to the destination node B 120 without correcting any errors that occurred in the transmission from the source node A 110 to the intermediate node C 120. The transmit powers at the source and intermediate nodes are $(\alpha_{t_e}^A, \alpha_{t_e}^C)$ and the optimal bit error rates at the intermediate node and the destination node are $(*Pr_e^{ac}, *Pr_e^{cb})$. Because relaying allows bit errors to propagate from intermediate node to destination node, Equation (3)

$$*Pr_e^{ac} + *Pr_e^{cb} = Pr_e \quad (3)$$

is satisfied by $$\ln\left(\frac{d_{ac}^{\gamma} 10^{x_{ac}/10}}{d_{cb}^{\gamma} 10^{x_{cb}/10}}\right) = \ln\left(Q^{-1}\left(\frac{\log_2 M}{(1-1/M)}(Pr_e^{ab} - Pr_e^{ac})\right)\right) +$$

$$\left(\text{erf}^{-1}\left(1 - \frac{2\log_2 M}{(1-1/M)}(Pr_e^{ab} - Pr_e^{ac})\right)\right)^2 -$$

$$\left(\text{erf}^{-1}\left(1 - \frac{2\log_2 M}{4(1-1/M)}Pr_e^{ac}\right)\right)^2 -$$

$$\ln\left(Q^{-1}\left(\frac{2\log_2 M}{4(1-1/M)}Pr_e^{ac}\right)\right)$$

and $*Pr_e^{cb}$ is found by $*Pr_e^{cb} = Pr_e - *Pr_e^{ac}$.

From these optimal bit error rates, the optimal transmit powers $(\alpha_{t_e}^A, \alpha_{t_e}^C)$ are determined. After the values $(\alpha_{t_e}^A, \alpha_{t_e}^C)$ are known, the source node A 110 can then determine the power savings according to $$\Delta\alpha_{relay} = \alpha_{t_e}^A + \alpha_{t_e}^C - \alpha_{t_e}^{AB} + P_c.$$

The above described method finds $(*Pr_e^{ac}, *Pr_e^{cb}, \alpha_{t_e}^A, \alpha_{t_e}^C)$ for any rectangular M-ary modulation scheme, however, the same analysis technique applies to other modulation schemes as well.

The value $\Delta\alpha_{relay}$ is always less than the value $\Delta\alpha_{regen}$ because, for a fixed $Pr_e$, the relay method requires additional power.

However, this additional power is only a fraction of a decibel. Therefore, the intermediate node 130 can determine whether to select relay mode or regenerator mode based on local criteria, such as processing load. The intermediate node 130 can then perform relaying and the overall system still achieves power reduction.

Node Structure

Figure 4:
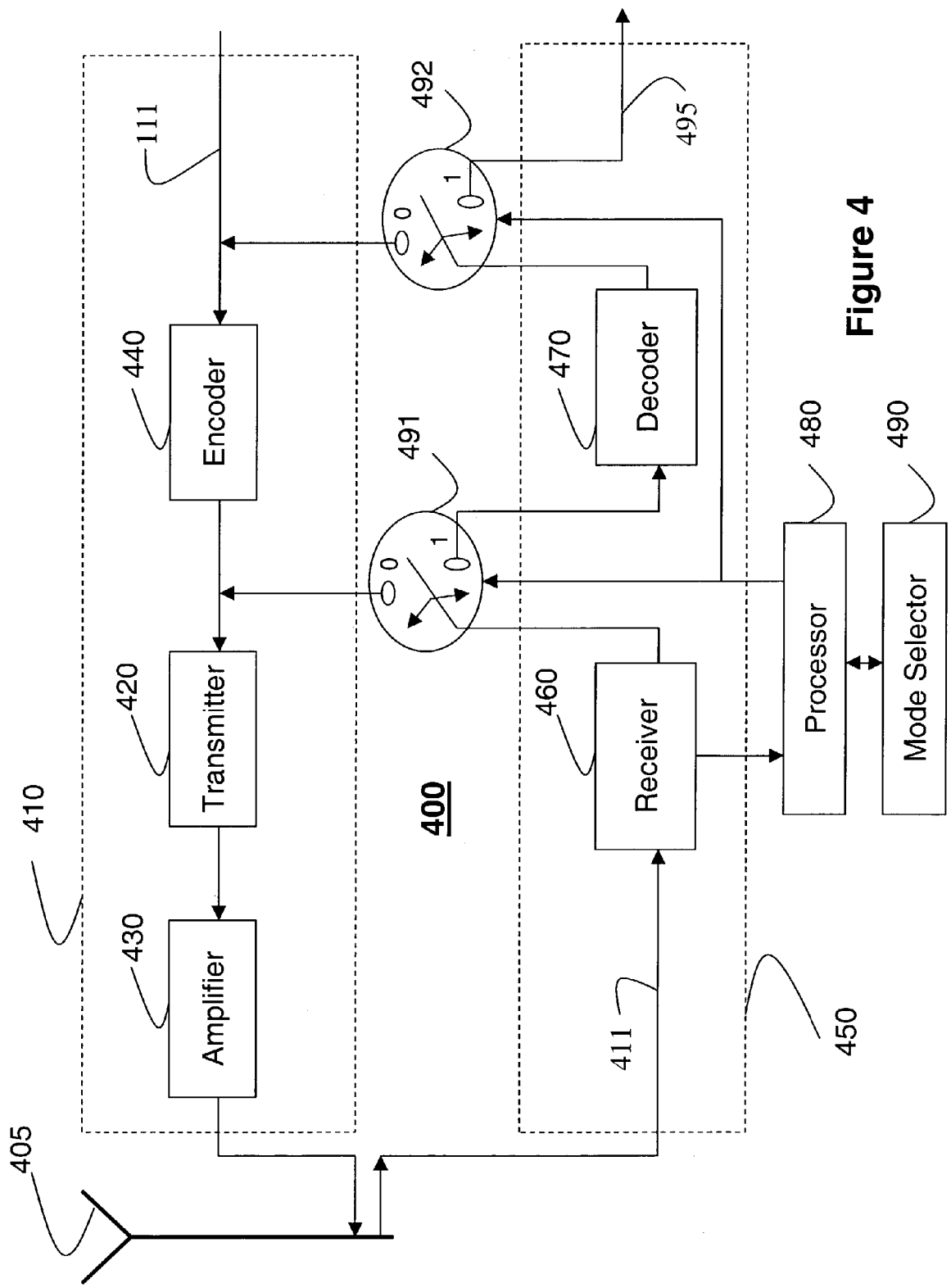
FIG. 4 is a block diagram of a wireless node according to the invention.

FIG. 4 shows a node 400 according to the invention. Each node includes an antenna 405 connected to a transmit block 410 and a receive block 450. The transmit and receive blocks are coupled to each other by switches 491–492. In addition, the node includes a processor 480 and a mode selector 490.

The transmit block 410 includes an encoder 440, a transmitter 420, and an amplifier 430. The receive block includes a receiver 460 and a decoder 470.

Node Operation

The transmit block 410 encodes, modulates, and amplifies the signal 111. The signal can originate locally or from another node.

The receive block chain 450 demodulates and decodes a received signal 411. The output of the receiver block 460 is a bitstream including the message 113, that is directed to the processor 480, and to either the transmitter for relaying when the switch 491 is in the "0" (off) position, or to the decoder 470 when the switch 491 is in the "1" (on) position. The decoder 470 decodes the bit stream 461 and corrects bit errors.

After decoding, the message 113 is reconstructed and is either transmitted by the transmit chain 410 if the switch 492 is in the "0" position for regeneration mode, or is passed to the local node 495 if the processing unit 480 determines the message 113 is intended for the local node.

The processor 480 continuously processes received messages and determines if the messages are relay control messages, relay data, or data destined for the local node. The processor also determines the setting of the switches 491–492. If the data are relay data, the decision of what mode, e.g., regenerator or relay, to forward the data is made by the mode selector 490. The decision is made as a function of the savings, and the switches 491 and 492 are set accordingly.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention

We claim:

1. A method for reducing power consumption in a multi-hop wireless communications network including a plurality of nodes, comprising;
   receiving, at an intermediate node, a signal from a source node, the signal including a relay request, a message, a relay power requirement and a regeneration power requirement;
   accepting the request if available power at the intermediate node exceeds an amount of power required to relay the message to a destination node;
   selecting a relay mode or a regeneration mode based on local criteria at the intermediate node;
   relaying the message to the destination node using the selected mode.

2. The method of claim 1 wherein the local criteria includes a current processing load at the intermediate node.

3. The method of claim 1 further comprising:
   sending an indication of acceptance to the source node if the relay request is accepted; and
   sending an indication of denial to the source node if the relay request is denied.

4. The method of claim 1 wherein the selected mode is the relay mode, and the step of relaying further comprises:
   amplifying the signal; and
   transmitting the amplified signal to the destination node.

5. The method of claim 1 wherein the selected mode is the regeneration mode, and the step of relaying further comprises:
   demodulating the signal;
   decoding the signal;
   encoding the signal;
   amplifying the signal; and
   transmitting the amplified signal to the destination node.

6. The method of claim 1 wherein the source node determines a required transmission power on a direct path from the source node to the destination node by $\alpha_{t_e}^{AB} = \alpha_{r_e} d_{ab}^{\gamma} 10^{x_{ab}/10}$, watts, where $\alpha_{re}$ is a required received power to meet a bit error rate requirement, $Pr_e$, $\gamma$ is a pathloss exponent and $x_{ab}$ is a shadowing loss, in decibels.

7. The method of claim 6, wherein a power savings is a difference between power used on the relay path and the power used on the direct path, $(\alpha_{t_e}^{A}, \alpha_{t_e}^{C})$ respectively, and further comprising:
   determining the power savings using the regeneration mode as
   $$\Delta\alpha_{regen} = \alpha_{t_e}^{A} + \alpha_{t_e}^{C} - \alpha_{t_e}^{AB} + P_c.$$

8. The method of claim 7 wherein optimal bit error rates at the intermediate node and the destination node are $(*Pr_e^{ac}, *Pr_e^{cb})$, respectively, a bit error rate requirement, $*Pr_e^{ac} + *Pr_e^{cb} = Pr_e$, for relay mode will satisfy $$\ln\left(\frac{d_{ac}^{\gamma} 10^{x_{ac}/10}}{d_{cb}^{\gamma} 10^{x_{cb}/10}}\right) = \ln\left(Q^{-1}\left(\frac{\log_2 M}{(1-1/M)}(Pr_e^{ab} - Pr_e^{ac})\right)\right) +$$
$$\left(\text{erf}^{-1}\left(1 - \frac{2\log_2 M}{(1-1/M)}(Pr_e^{ab} - Pr_e^{ac})\right)\right)^2 -$$
$$\left(\text{erf}^{-1}\left(1 - \frac{2\log_2 M}{4(1-1/M)} Pr_e^{ac}\right)\right)^2 -$$
$$\ln\left(Q^{-1}\left(\frac{2\log_2 M}{4(1-1/M)} Pr_e^{ac}\right)\right)$$

and $*Pr_e^{cb}$ is found by $*Pr_e^{cb} = Pr_e - *Pr_e^{ac}$.

9. A wireless communications system including a plurality of nodes, each node comprising;
   a mode selector configured to select one of a relay mode and a regeneration mode;
   first switch means configured to route a received signal to a transmitter if the selected mode is the relay mode, and to a decoder if the selected mode is the regeneration mode, the decoder providing a decoded signal; and
   second switch means configured to route the decoded signal to an encoder coupled to the transmitter if the selected mode is the regeneration mode.

* * * * *